United States Patent
Carr et al.

(10) Patent No.: US 10,787,956 B2
(45) Date of Patent: Sep. 29, 2020

(54) TURBOCHARGER VARIABLE SPEED CONTROL

(71) Applicant: Progress Rail Locomotive Inc., LaGrange, IL (US)

(72) Inventors: John Michael Carr, Chicago, IL (US); Gary R. Svihla, Burr Ridge, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 0 days.

(21) Appl. No.: 16/216,315

(22) Filed: Dec. 11, 2018

(65) Prior Publication Data

US 2020/0182137 A1    Jun. 11, 2020

(51) Int. Cl.
| | |
|---|---|
| *F02B 37/10* | (2006.01) |
| *F02B 39/04* | (2006.01) |
| *F02B 37/14* | (2006.01) |
| *F02C 6/12* | (2006.01) |
| *F02B 39/12* | (2006.01) |

(52) U.S. Cl.
CPC ............ *F02B 37/105* (2013.01); *F02B 37/14* (2013.01); *F02B 39/04* (2013.01); *F02B 39/12* (2013.01); *F02C 6/12* (2013.01)

(58) Field of Classification Search
CPC ........ F02B 37/105; F02B 39/04; F02B 39/12; F02B 37/14; F02C 6/12
USPC ................................................ 60/605.1–612
See application file for complete search history.

(56) References Cited

U.S. PATENT DOCUMENTS

| | | | | |
|---|---|---|---|---|
| 2,259,732 A | * | 10/1941 | Burtnett ................ | B60W 10/02 477/94 |
| 2,769,303 A | * | 11/1956 | Lucia ...................... | F02B 33/00 60/608 |
| 3,007,302 A | * | 11/1961 | Vincent ................... | F02B 71/06 60/598 |
| 3,812,928 A | * | 5/1974 | Rockwell ............. | B60K 7/0007 180/65.51 |
| 4,730,457 A | | 3/1988 | Yamada et al. | |
| 6,058,916 A | * | 5/2000 | Ozawa .................... | F02B 33/34 123/559.3 |

(Continued)

FOREIGN PATENT DOCUMENTS

| | | |
|---|---|---|
| CN | 103089407 A | 5/2013 |
| CN | 103726926 A | 4/2014 |
| CN | 103726927 A | 4/2014 |

*Primary Examiner* — Hoang M Nguyen
(74) *Attorney, Agent, or Firm* — Miller, Matthias & Hull

(57) ABSTRACT

A turbocharger variable speed control mechanism for a turbocharger for an engine includes a sun gear of a planetary gear set coupled to a turbocharger shaft, a planet carrier operatively connected to an engine output shaft of the engine, a brake disk coupled to and rotatable with a ring gear, and a brake actuator mechanism proximate the brake disk and mounted to a turbocharger housing. The brake actuator mechanism is selectively actuatable between a non-braking state where no braking force is applied to the brake disk so that the ring gear is free to rotate relative to the turbocharger housing, and a full braking state where a full braking force is applied to the brake disk such that the ring gear is held stationary relative to the turbocharger housing and rotation of the planet carrier is transmitted through the planetary gear set to cause rotation of the turbocharger shaft.

20 Claims, 3 Drawing Sheets

(56) References Cited

U.S. PATENT DOCUMENTS

| | | | |
|---|---|---|---|
| 7,765,805 B2* | 8/2010 | Lofgren | F02B 37/105 |
| | | | 123/559.1 |
| 9,127,589 B2 | 9/2015 | Persson et al. | |
| 2016/0017793 A1* | 1/2016 | Johnson | F02B 39/10 |
| | | | 417/44.1 |

* cited by examiner

TURBOCHARGER VARIABLE SPEED CONTROL

TECHNICAL FIELD

The present disclosure relates generally to turbochargers and, more particularly, to turbochargers having variable clutches or brakes functioning as turbocharger variable speed control mechanisms by controlling a planetary gear set coupling the turbocharger shaft to an engine output shaft to positively drive the turbocharger under certain operating conditions.

BACKGROUND

Internal combustion engines are used to provide a power source for vehicles, generator sets, heavy mechanical equipment, large tractors, on-road vehicles, off-road vehicles and the like. An internal combustion engine, such as a diesel engine, a gasoline engine, a gaseous fuel powered engine and the like, is supplied with a mixture of air and fuel for combustion within combustion chambers of the engine to generate mechanical power output. Under certain operating conditions, a turbocharger integrated with an internal combustion engine improves overall engine efficiency and provides increased power, particularly during vehicle acceleration. In operation, a radial or axial inflow turbine wheel or wheels are driven by engine exhaust gas. The turbine wheel then drives a radial compressor wheel that increases the pressure of intake air provided to the engine. The increased density of the intake air enhances the combustion process, resulting in a higher power output and increased engine efficiency over a naturally aspirated engine's power output and efficiency.

Turbochargers are distinct devices from superchargers that are mechanically driven by the internal combustion engine, often through a belt connected to the engine's output shaft. Instead, the turbochargers are powered by the turbine wheels being driven by the engine's exhaust gas expansion. Compared with a mechanically driven supercharger, turbochargers can rotate at speeds that are considerably higher than those of superchargers and tend to be more efficient devices. However, turbochargers can be less responsive at lower engine speeds and lower exhaust temperatures and pressures. To increase responsiveness in four-cycle engines or to provide an air pump at low engine horsepower output in two-cycle engines, turbochargers may be operatively connected to the engine output shaft via a belt or intervening gear train to be driven by the engine at low engine speeds and low exhaust temperatures and pressures where the engine exhaust does not create sufficient torque on the turbine wheel to sufficiently power the compressor wheel. Such implementations may include a one-way overrunning clutch that allows the engine output shaft to drive the turbocharger shaft, and correspondingly the turbine wheel and compressor wheel, until the exhaust temperature and pressure are sufficient to spin the turbocharger shaft at speeds greater than those dictated by the connection to the engine.

SUMMARY OF THE DISCLOSURE

In one aspect of the present disclosure, a turbocharger variable speed control mechanism for a turbocharger for an internal combustion engine is disclosed. The turbocharger variable speed control mechanism may include a planetary gear set having a sun gear coupled to a turbocharger shaft for rotation therewith, a ring gear, a planet carrier operatively connected to an engine output shaft of the internal combustion engine so that rotation of the engine output shaft causes corresponding rotation of the planet carrier, and a plurality of planet gears rotatably mounted on the planet carrier and meshing with the sun gear and the ring gear. The turbocharger variable speed control mechanism may further include a ring gear support sleeve disposed in axial alignment over a portion of the turbocharger shaft such that the ring gear support sleeve and the turbocharger shaft are rotatable relative to each other, wherein the ring gear support sleeve is coupled to the ring gear for rotation therewith, a brake disk mounted on the ring gear support sleeve for rotation therewith and extending radially outward from the ring gear support sleeve, and a brake actuator mechanism disposed proximate the brake disk and mounted to a turbocharger housing of the turbocharger to remain stationary relative to the turbocharger housing. The brake actuator mechanism may be selectively actuatable between a non-braking state where the brake actuator mechanism does not apply a braking force to the brake disk so that the ring gear is free to rotate relative to the turbocharger housing, and a full braking state where the brake actuator mechanism applies a full braking force to the brake disk such that the ring gear is held stationary relative to the turbocharger housing and rotation of the planet carrier is transmitted through the planetary gear set to cause rotation of the turbocharger shaft.

In another aspect of the present disclosure, a turbocharger for an internal combustion engine is disclosed. The turbocharger may include a turbocharger housing, a turbocharger shaft mounted for rotation within the turbocharger housing, a turbine wheel mounted on the turbocharger shaft for rotation therewith, wherein exhaust gas from the internal combustion engine is directed at the turbine wheel to create an exhaust torque on the turbocharger shaft, a compressor wheel mounted on the turbocharger shaft for rotation therewith, wherein compressed air is discharged from the turbocharger to an air intake manifold of the internal combustion engine due to rotation of the compressor wheel, and a planetary gear set. The planetary gear set may have a sun gear coupled to the turbocharger shaft for rotation therewith, a ring gear, a plurality of planet gears meshing with the sun gear and the ring gear, and a planet carrier having the plurality of planet gears rotatably mounted thereon and operatively connected to an engine output shaft of the internal combustion engine so that rotation of the engine output shaft causes corresponding rotation of the planet carrier. The turbocharger may further include a ring gear support sleeve disposed in axial alignment over a portion of the turbocharger shaft such that the ring gear support sleeve and the turbocharger shaft are rotatable relative to each other, wherein the ring gear support sleeve is coupled to the ring gear for rotation therewith, a brake disk mounted on the ring gear support sleeve for rotation therewith and extending radially outward from the ring gear support sleeve, and a brake actuator mechanism disposed proximate the brake disk and mounted to the turbocharger housing to remain stationary relative to the turbocharger housing. The brake actuator mechanism may be selectively actuatable between a non-braking state where the brake actuator mechanism does not apply a braking force to the brake disk so that the ring gear is free to rotate relative to the turbocharger housing, and a full braking state where the brake actuator mechanism applies a full braking force to the brake disk such that the ring gear is held stationary relative to the turbocharger housing and rotation of the planet carrier is transmitted through the planetary gear set to cause rotation of the turbocharger shaft.

In a further aspect of the present disclosure, a method for providing variable speed control torque to a turbocharger for an internal combustion engine is disclosed. The turbocharger may include a turbocharger shaft with a turbine wheel and a compressor wheel mounted for rotation therewith, a planetary gear set having a sun gear coupled to the turbocharger shaft for rotation therewith, a ring gear, a plurality of planet gears meshing with the sun gear and the ring gear, and a planet carrier having the plurality of planet gears rotatably mounted thereon and operatively connected to an engine output shaft of the internal combustion engine so that rotation of the engine output shaft causes corresponding rotation of the planet carrier. The method for providing variable speed control torque may include determining an actual engine output of the internal combustion engine, comparing the actual engine output to a first predetermined engine output and a second predetermined engine output, wherein the second predetermined engine output is greater than the first predetermined engine output actuating a brake actuator mechanism to apply a full braking force to the ring gear in response to determining that the actual engine output is greater than the first predetermined engine output and less than the second predetermined engine output, wherein the ring gear is held stationary by the full braking force relative to a turbocharger housing of the turbocharger and rotation of the planet carrier is transmitted through the planetary gear set to cause rotation of the turbocharger shaft, and applying no braking force from the brake actuator mechanism to the ring gear in response to determining that the actual engine output is greater than the second predetermined engine output so that the ring gear is free to rotate relative to the turbocharger housing.

Additional aspects are defined by the claims of this patent.

DETAILED DESCRIPTION

Figure 1:
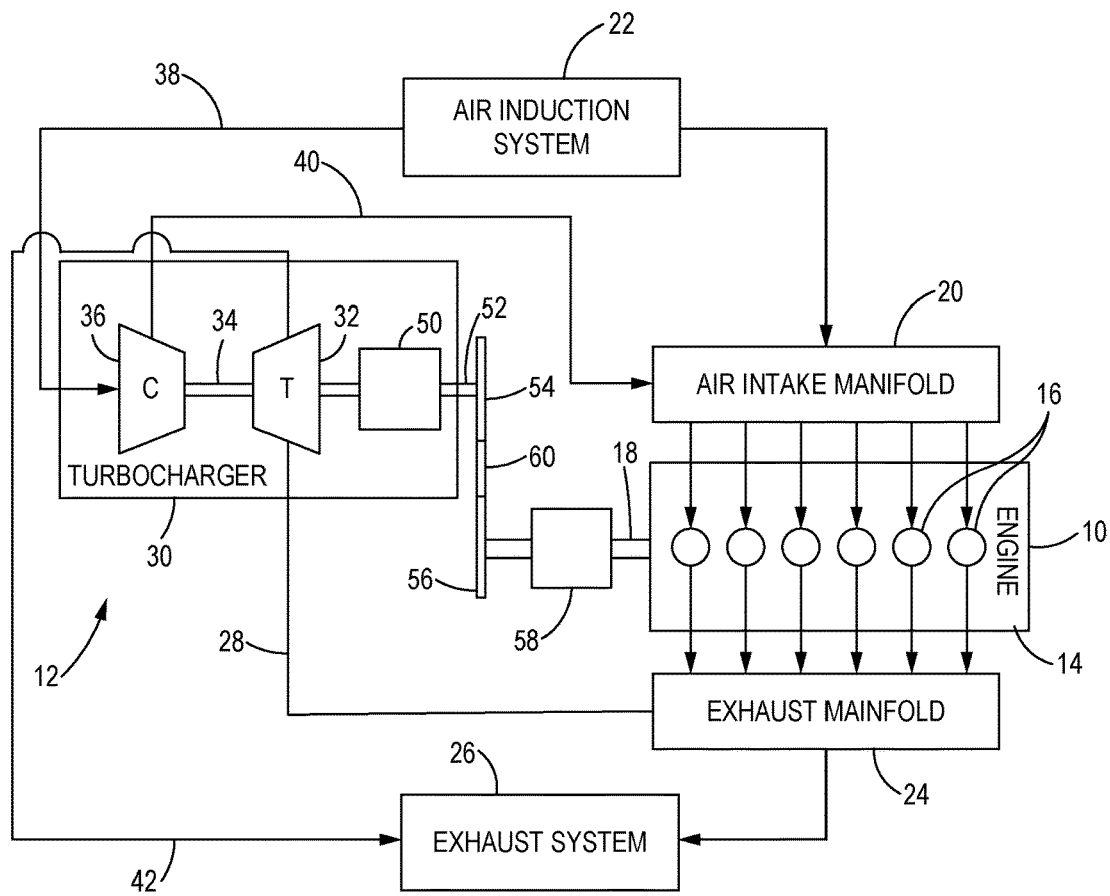
FIG. 1 is a schematic illustration of an exemplary internal combustion engine and a turbocharger with a turbocharger variable speed control mechanism in accordance with the present disclosure.

Referring to FIG. 1, an internal combustion engine 10 having an integrated turbocharger 12 in accordance with the present disclosure is illustrated schematically. The engine 10 may find applications in mobile machines (not shown) such as, but not limited to, vehicles, heavy mechanical equipment, large tractors, on-road vehicles, off-road vehicles and the like, and in stationary machines such as generator sets and pumps. The engine 10 may include a crankcase 14 that forms a plurality of compression cylinders 16. While six compression cylinders 16 are shown in an inline arrangement for illustration purposes, fewer or more compression cylinders 16 arranged in inline or alternative configurations within the crankcase 14, for example in a V-configuration, may be used. Each compression cylinder 16 may include a reciprocating piston (not shown) connected to a common engine output shaft 18. In the engine 10, the combustion of a fuel and air mixture in the compression cylinders 16 generates motive power that rotates the engine output shaft 18, and a resultant mixture of exhaust gas is produced as is known in the art.

The engine 10 may include an air intake manifold 20 that is selectively in fluid communication with each compression cylinder 16 and provides compressed intake air to the compression cylinders 16. Air may be provided to air intake manifold 20 by an air induction system 22 that draws air from the ambient atmosphere surrounding the engine 10 and the machine in which the engine 10 is implemented. The engine 10 may include a fuel tank (not shown) to store suitable fuel for combustion in the compression cylinders 16 of the engine 10. In various embodiments, the engine 10 may be configured to combust gasoline, diesel fuel, natural gas (liquefied or compressed) or other combustible energy sources, and the fuel tank will be configured as appropriate to store the fuel and provide the fuel to the engine 10 as required and known in the art. Compressed air from the air intake manifold along with the fuel from the fuel tank provided to the compression cylinders 16 forms a combustible mixture that ignites when compressed or in the presence of a spark. Combustion byproducts are evacuated from each compression cylinder 16 through exhaust valves (not shown) to an exhaust manifold 24 that collects the exhaust gas from each compression cylinder 16, and at least a portion of the exhaust gases may be transmitted to an exhaust system 26 for after treatment prior to being released back into the atmosphere. In the engine 10, the intake air in the air intake manifold 20 as well as the exhaust gas released to the exhaust manifold 24 are under pressure.

In the illustrated embodiment, the turbocharger 12 is integrated with the engine 10 to provide compressed air with greater pressure to the air intake manifold 20. As schematically illustrated in FIG. 1, the turbocharger 12 may be fluidly connected to the exhaust manifold 24 and arranged to receive pressurized exhaust gas therefrom via a high pressure exhaust gas line 28. A turbocharger housing 30 of the turbocharger 12 is configured so that the pressurized exhaust gas from the high pressure exhaust gas line 28 acts on a turbine wheel 32 mounted on a turbocharger shaft 34 within the turbocharger housing 30. The turbocharger 12 may further include a compressor wheel 36 also mounted on the turbocharger shaft 34 for rotation with the turbocharger shaft 34 and the turbine wheel 32. The pressurize exhaust gas from the high pressure exhaust gas line 28 is directed at the turbine wheel 32 to create exhaust torque on the turbocharger shaft 34. When the exhaust gas temperature and pressure are sufficient, the exhaust torque causes the turbine wheel 32 to rotate the turbocharger shaft 34 and the compressor wheel 36. The compressor portion of the turbocharger 12 in which the compressor wheel 36 is disposed may receive air from the air induction system 22 via a low pressure air line 38. The rotating compressor wheel 36 compresses the air from the air induction system 22 and outputs compressed air to the air intake manifold via a high pressure air line 40 for addition to the air coming directly from the air induction system 22 and the fuel from the fuel tank. After powering the turbine wheel 32, the spent exhaust gas is discharged by to the exhaust system via a low pressure exhaust gas return line 42.

During some operating conditions of the engine 10, it may be desirable to drive the turbine wheel 32 of the turbocharger 12 even though the temperature and pressure of the exhaust gas in the high pressure exhaust gas line 28 are insufficient to rotate the turbine wheel 32 or to rotate the turbine wheel 32 at a desired speed. For example, at low engine speeds such as when the engine 10 is idling, emissions of pollutants such as nitrous oxides (NOx) can increase and low exhaust temperatures can make exhaust after treatment systems in the exhaust system 26 ineffective. To selectively provide direct drive to the turbocharger 12 by the engine 10 when the operating conditions dictate, the turbocharger 12 in accordance with the present disclosure is configured with a turbocharger variable speed control mechanism 50. The turbocharger variable speed control mechanism 50 may be selectively engageable to allow the engine output shaft 18 to drive the turbocharger shaft 34 when the exhaust gas will not drive the turbine wheel 32, and disengageable when the exhaust gas will create sufficient torque and rotate the turbine wheel 32 and the compressor wheel 36 at sufficient speeds so that direct drive by the engine 10 is unnecessary.

As shown in FIG. 1, the turbocharger variable speed control mechanism 50 may be installed within the turbocharger housing 30 and coupled between the turbocharger shaft 34 and a carrier shaft 52. The carrier shaft 52 has a carrier drive gear 54 mounted thereon and rotatable therewith. An operative connection between the engine 10 and the turbocharger variable speed control mechanism 50 may be provided by a turbocharger drive gear 56 that is connected to a gear train or transmission 58 that is driven by the engine output shaft 18. The turbocharger drive gear 56 is operatively connected to the carrier drive gear 54 by one or more idler gears 60 so that the carrier shaft 52 will spin at a desired speed and direction relative to the engine output shaft 18.

Figure 2:
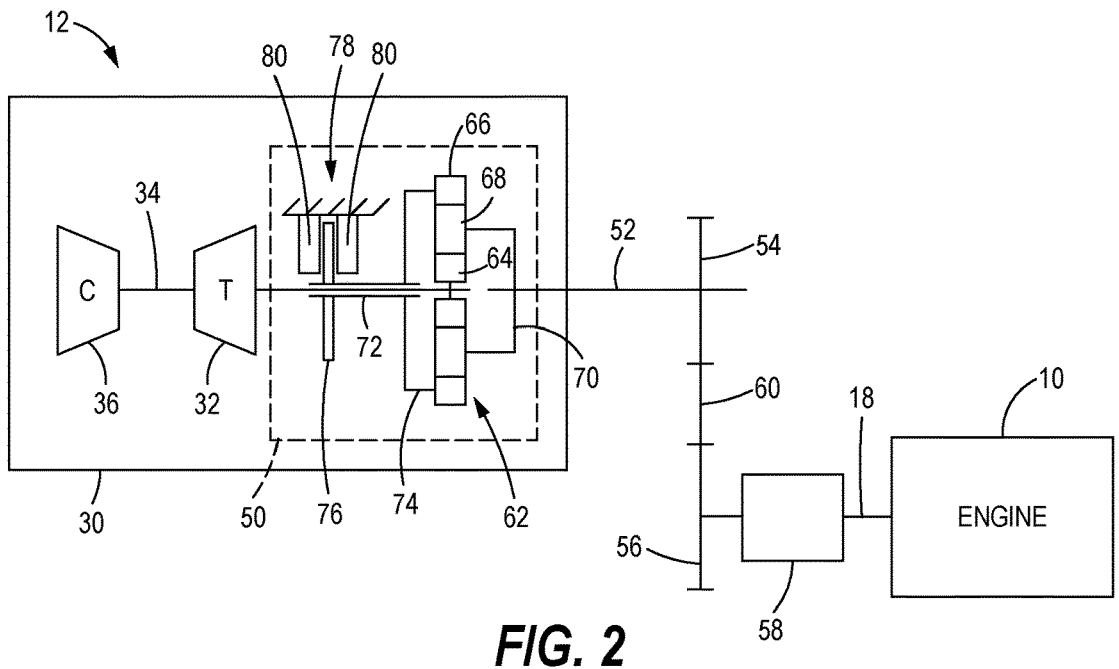
FIG. 2 is a schematic illustration of the components of the turbocharger and the turbocharger variable speed control mechanism of FIG. 1.

The turbocharger 12 and the components of the turbocharger variable speed control mechanism 50 are illustrated schematically in greater detail in FIG. 2. The carrier shaft 52 may extend through the turbocharger housing 30 so that the carrier drive gear 54 is externally accessible. The turbocharger variable speed control mechanism 50 includes a planetary gear set 62 that may serve to transmit torque from the engine output shaft 18 and the carrier shaft 52 to the turbocharger shaft 34 when the turbocharger variable speed control mechanism 50 is engaged. The planetary gear set 62 includes a sun gear 64 coupled to the turbocharger shaft 34 for rotation therewith, a ring gear 66, and a plurality of planet gears 68 meshing with the sun gear 64 and the ring gear 66. The planet gears 68 are rotatably mounted on a planet carrier 70 that is mounted on and rotatable with the carrier shaft 52. Configured in this way, the planet carrier 70 is operatively connected to the engine output shaft 18 so that rotation of the engine output shaft 18 causes corresponding rotation of the planet carrier 70. As discussed further below, depending on the state of the turbocharger variable speed control mechanism 50 and whether the ring gear 66 is correspondingly constrained or free to rotate, torque in the carrier shaft 52 may be transmitted through the planetary gear set 62 to rotate the turbocharger shaft 34, the turbine wheel 32 and the compressor wheel 36.

The turbocharger variable speed control mechanism 50 further includes a ring gear support sleeve 72 disposed in axial alignment over a portion of the turbocharger shaft 34 such that the ring gear support sleeve 72 and the turbocharger shaft 34 are rotatable relative to each other. The ring gear support sleeve 72 is coupled to the ring gear 66 by a ring gear support arm 74. Coupled in this way, the ring gear 66, the ring gear support sleeve 72 and the ring gear support arm 74 can rotate together relative to the turbocharger shaft 34. Further, as discussed more fully below, the ring gear 66 and the ring gear support sleeve 72 can be locked in place while allowing the turbocharger shaft 34 to rotate as rotation of the carrier shaft 52 and the planet carrier 70 cause the sun gear 64 to rotate.

A brake disk 76 is mounted on an exterior surface of the ring gear support sleeve 72 for rotation therewith and with the ring gear 66. The brake disk 76 extends radially outward from the ring gear support sleeve 72 and is part of a braking system that can selectively engage and disengage to control the rotation of the ring gear 66 and, correspondingly, the transfer of torque from the carrier shaft 52 through the planetary gear set 62 to the turbocharger shaft 34. The braking mechanism further includes a brake actuator mechanism 78 that is disposed proximate the brake disk 76. The brake actuator mechanism 78 is mounted directly or indirectly to the turbocharger housing 30 to remain stationary relative to the turbocharger housing 30 as the other components of the turbocharger 12 rotate within the turbocharger housing 30.

The brake actuator mechanism 78 can be any appropriate actuation mechanism that is selectively actuatable to apply a braking force to the brake disk 76 to control the rotation of the ring gear 66. In the illustrated embodiment, the brake actuator mechanism 78 is an electromagnetic braking device capable of generating a magnetic field to create the braking force on the brake disk 76. The brake actuator mechanism 78 includes a pair of electro magnets 80 directly or indirectly mounted to the turbocharger housing 30 and disposed on either side of the brake disk 76. Positioned as illustrated and described, a magnetic field generated by the electro magnets 80 acts on the brake disk 76 to create braking force resisting rotation of the brake disk 76 and, correspondingly, the ring gear 66. The strength of the magnetic field generated by the electro magnets 80 can be varied by modulating a current to the electro magnets 80, which in turn will modulate the braking force applied to the brake disk 76. Modulation of the current to the electro magnets 80 can be effected by means known in the art.

The magnitude of the braking force created by the electro magnets 80 will control the rotation of the ring gear 66 and the transmission of torque through the planetary gear set 62 from the carrier shaft 52 to the turbocharger shaft 34. When the brake actuator mechanism 78 is in a non-braking state, current to the electro magnets 80 is cut off so that no magnetic field is generated and no braking force is applied to the brake disk 76. In the non-braking state, the ring gear 66 is free to rotate about the turbocharger shaft 34 so that rotation and torque on the carrier shaft 52 are not transmitted to the turbocharger shaft 34 except to the extent that there is transmission due to friction in the system. At the opposite extreme, the brake actuator mechanism 78 is actuated to a full braking state where current is supplied to the electro magnets 80 to generate a magnetic field that creates a full braking force on the brake disk 76 that will hold the brake disk 76 and the ring gear 66 stationary relative to the turbocharger housing 30 and the turbocharger shaft 34 under the anticipated operating conditions of the engine 10 and the turbocharger 12. With the ring gear 66 held stationary, rotation and torque in the carrier shaft 52 will be transmitted to the turbocharger shaft 34 according to the gear ratio and the torque ratio, respectively, of the planetary gear set 62.

Under certain operating conditions of the engine 10 and the turbocharger 12, it may be desirable to actuate the brake actuator mechanism 78 to a partial braking state that may hold the ring gear 66 stationary at low torque but allow slippage and rotation of the ring gear 66 when higher torques are applied to the turbine wheel 32 by the exhaust gas. For example, when the engine 10 is idling and the temperature and pressure of the exhaust gas are too low to rotate the turbine wheel 32, NOx can build up and the low exhaust temperature may make the after treatment systems in the exhaust system 26 ineffective. In the partial braking state, current may be provided to the electro magnets 80 to generate a magnetic field that creates a partial braking force on the brake disk 76 sufficient to hold the ring gear 66 stationary and rotate the turbocharger shaft 34 so that the turbine wheel 32 can add energy and pump the exhaust gas to the exhaust system 26 at a higher temperature and pressure for after treatment. At the same time, the partial braking force may be weak enough to allow slippage of the brake disk 76 and the ring gear 66 once the turbocharger 12 is spooled up with the exhaust gas having sufficient temperature and pressure to rotate the turbine wheel 32 faster than the output speed from the planetary gear set 62. At that point, the exhaust torque applied to the turbocharger shaft 34 can create a ring gear torque on the ring gear 66 that exceeds the braking torque created by the partial braking force on the brake disk 76. The brake disk 76 will slip relative to the electro magnets 80 so that the ring gear 66 can rotate and allow the turbocharger shaft 34 to rotate free of the constraint of the planetary gear set 62 and the shaft speed of the carrier shaft 52.

The brake actuator mechanism 78 as illustrated is exemplary, and other brake actuator mechanisms may be implemented and are contemplated by the inventor. For example, an alternative brake actuator may include a brake pad or pads directly or indirectly mounted to the turbocharger housing 30 and movable axially or radially into and out of contact with the brake disk 76 to apply the braking force. The brake actuator mechanism 78 may further include an actuator, such as a solenoid actuator or a hydraulic actuator such as a hydraulic piston, that can adjust the position of the brake pad and the braking force applied to the brake disk 76. For the solenoid actuator, current to the solenoid actuator may be modulated in a similar manner as the electro magnets 80 to generate a magnetic field that moves the brake pad into engagement with the brake disk 76 to create the braking force on the brake disk 76. The current to the solenoid actuator may be cut off in the non-braking state so no braking force is applied, may be applied to move the brake pad into engagement with the brake disk 76 with the full braking force in the full braking state, and may be modulated to an intermediate level to create the partial braking force in the partial braking state.

The solenoid actuator in the above example could be replaced by a hydraulic piston capable of moving the brake pad between the non-braking state, the partial braking state and the full braking state by varying the fluid pressure to the hydraulic piston. In a further embodiment, the brake actuator mechanism may be a stepper motor. In this embodiment, the brake disk 76 and the electro magnets 80 may be replaced by an electric motor rotor and stator, respectively. The current to the electric motor could be modulated to hold the rotor and the ring gear 66 stationary in the full braking state, to allow the rotor and the ring gear 66 to rotate freely in the non-braking state, and to drive the rotor and the ring gear 66 to rotate at particular speeds between full stop and freewheeling to vary the gear ratio and the torque ratio of the planetary gear set 62 to achieve desired performance of the engine 10 and the turbocharger 12.

In another alternative embodiment, the brake actuation mechanism may be a hydraulic drive system. In an implementation of a hydraulic drive system, the ring gear 66 is operatively connected to a hydraulic pump. In one version, the hydraulic pump may be a positive displacement pump, with return flow from the pump being modulated by a proportional or solenoid flow control valve. When the flow control valve is shut, the positive displacement pump would stop moving, which would create the braking force on the ring gear 66 to stop rotation of the ring gear 66. When the flow control valve is completely open, the positive displacement pump would freewheel and provide minimal braking force on the ring gear 66 so that the turbine wheel 32 can rotate freely in response to the exhaust gas torque. The flow control valve can be varied between the shut and completely open positions as necessary for the positive displacement pump to create a desired partial braking force on the ring gear 66. Proportional control of the positive displacement pump can be achieved by varying the back pressure on the pump, with the oil or other hydraulic fluid being returned to the oil pan or other appropriate low pressure reservoir. In a further alternative, the positive displacement pump may be paired with a motor operatively connected to the engine output shaft 18 so that pumping power would not be lost. Additional alternative brake actuator mechanisms are contemplated by the inventor as having use in turbochargers 12 in accordance with the present disclosure.

Figure 3:
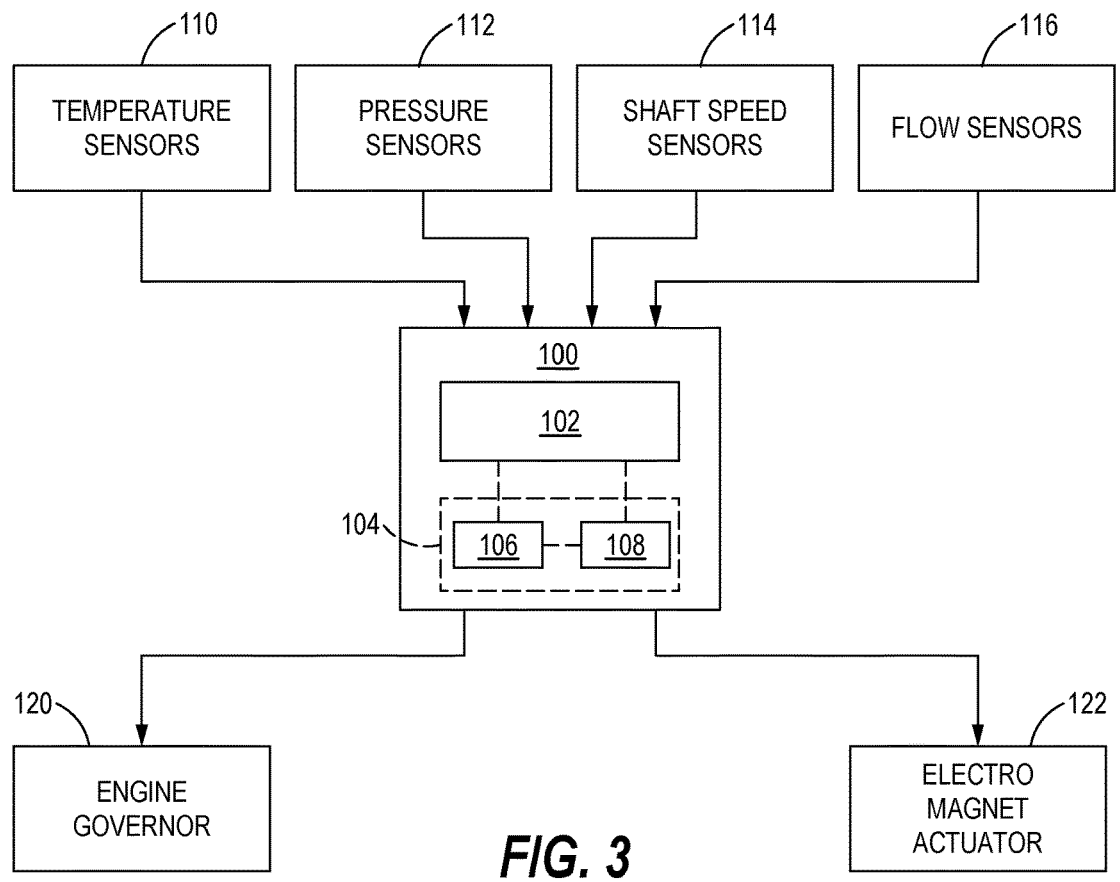
FIG. 3 is a block diagram of exemplary control components for the internal combustion engine and the turbocharger of FIG. 1 that may implement control of the turbocharger variable speed control mechanism in accordance with the present disclosure.

The engine 10 and the brake actuator mechanism 78 of the turbocharger variable speed control mechanism 50 are among the components that will be controlled to operate the engine 10 as efficiently as is practical. Referring to FIG. 3, an exemplary arrangement of electrical and control components for the engine 10 is shown with various control components that may be integrated into control of the turbocharger variable speed control mechanism 50 in accordance with the present disclosure. An electronic control module (ECM) 100 may be capable of processing information received from monitoring and control devices using software stored at the ECM 100, and outputting command and control signals to the controlled components of the engine 10 and the turbocharger variable speed control mechanism 50. The ECM 100 may include a processor 102 for executing a specified program, which controls and monitors various functions associated with the engine 10. The processor 102 may be operatively connected to a memory 104 that may have a read only memory (ROM) 106 for storing programs, and a random access memory (RAM) 108 serving as a working memory area for use in executing a program stored in the ROM 106. Although the processor 102 is shown, it is also possible and contemplated to use other electronic components such as a microcontroller, an application specific integrated circuit (ASIC) chip, or any other integrated circuit device.

While the discussion provided herein relates to the functionality of the turbocharger variable speed control mechanism 50, the ECM 100 may be configured to control other aspects of the operation of the engine 10 to respond to operator commands to output power for the machine or other system in which the engine 10 is integrated. Moreover, the ECM 100 may refer collectively to multiple control and processing devices across which the functionality of the engine 10, the turbocharger variable speed control mechanism 50 and other integrated systems may be distributed.

The ECM 100 may be operatively connected to the other components to exchange information as necessary to control the operation of the engine 10, the turbocharger variable speed control mechanism 50 and other systems.

The electronic and control components of the engine 10 and accompanying systems may include sensing devices providing information to the ECM 100 for monitoring the operational status of the engine 10, the turbocharger 12 and other components and systems, and for executing control functions. The sensing devices may include temperature sensors 110, pressure sensors 112, shaft speed sensors 114 and flow sensors 116 and the like. Each sensor 110, 112, 114, 116 is capable of detecting temperature, pressure, rate of rotation and fluid flow rate, respectively, and transmitting sensor signals to the ECM 100 having values corresponding to the magnitude of the sensed parameter. The sensors 110, 112, 114, 116 may be placed at relevant locations to provide meaningful information regarding the operational state of the engine 10 and the turbocharger 12. For example, temperature sensors 110 and pressure sensors 112 may be provided at the exhaust manifold 24 or the high pressure exhaust gas line 28 to calculate the energy in the exhaust gas provided to the turbocharger 12, or in the high pressure air line 40 to calculate the energy in the compressed air discharged to the air intake manifold 20. Temperature sensors 110 and pressure sensors 112 at the air intake manifold 20 and flow sensors 116 in the fluid lines (not shown) connecting a pressurized fluid source such as a fuel pump (not shown) to the compression cylinders 16 may provide information necessary to determine the richness of an air-fuel mixture provided to the compression cylinders 16 for combustion. A shaft speed sensor 114 on the engine output shaft 18 may indicate an output level of the engine 10, and a shaft speed sensor 114 on the turbocharger shaft 34 may indicate the rotational speed of the turbine wheel 32 and the compressor wheel 36. Additional sensors 110, 112, 114, 116 and other types of sensors may be placed at other relevant locations of the engine 10, the turbocharger 12 and other elements of the machine or system in which the engine 10 is implemented for monitoring and control of the engine 10 as known in the art, and information from the sensors 110, 112, 114, 116 may be used to control the turbocharger variable speed control mechanism 50 to operate in the non-braking, full braking and partial braking states as discussed herein.

The ECM 100 is also operatively connected to various output and control devices that may be the operational and controllable elements of the engine 10, the turbocharger 12 and the system that are controlled based on the information from the sensors 110, 112, 114, 116. The output and control devices can include an engine governor 120. The engine governor 120 may be integrated into the engine 10 and may be a mechanical governor, an electronic governor implemented in software, or other appropriate conventional engine output control mechanism and control strategy. The engine governor 120 may be operatively connected to and receive engine control signals from the ECM 100 to cause the engine governor 120 to increase, decrease or maintain the engine output speed and/or power output at the engine output shaft 18 as dictated by operator inputs and the information from the sensors 110, 112, 114, 116. An engine governor control module of the ECM 100 may determine values of operating parameters necessary for the engine 10 to produce a commanded output, such as fuel flow rates regulated by fuel flow valves, intake air flow rates regulated by air flow valves, engine output shaft speeds and the like, and transmit information in the engine control signals to cause the engine governor 120 to operate the engine 10 as commanded.

In the illustrated embodiment, the output and control devices may further include an electro magnet actuator 122, such as a current booster, that is operable to selectively provide current to the electro magnets 80 to generate the magnetic field and create the necessary braking force for the braking state dictated by the operation of the engine 10. In some embodiments, the electro magnet actuator 122 may be omitted where the ECM 100 can provide the necessary current to the electro magnets 80 directly without the necessity of current amplification. In other embodiments of the brake actuator mechanism 78, appropriate actuator devices may be implemented and operatively connected to the ECM 100 for transmission of appropriate control signals. The electro magnet actuator 122 may still be implemented where a solenoid actuator or an electric motor implemented in the turbocharger variable speed control mechanism 50 as described above. Where a brake pad and hydraulic piston are used, an appropriate flow control valve connecting the hydraulic piston to a pressurized fluid source may receive control signals from the ECM 100 causing the flow control valve to control the flow of fluid to and from the hydraulic piston to extend and retract the piston to move the brake pad into and out of engagement with the brake disk 76. The use of other actuators in alternative implementations of the turbocharger variable speed control mechanism 50 will be apparent to those skilled in the art and are contemplated by the inventor.

INDUSTRIAL APPLICABILITY

Figure 4:
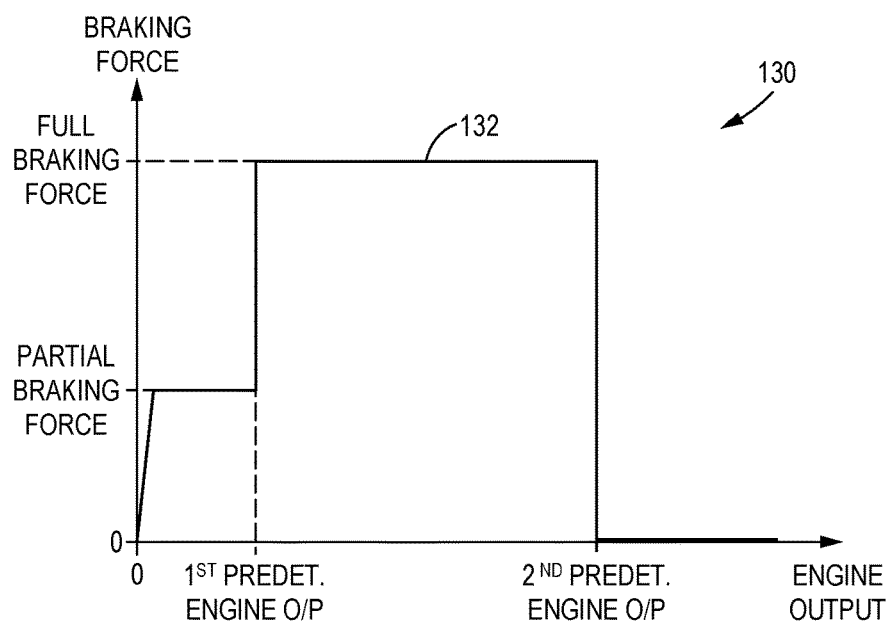
FIG. 4 is a graph of engine output versus braking force applied by a brake actuator mechanism of the turbocharger variable speed control mechanism in accordance with the present disclosure.

The turbocharger variable speed control mechanism 50 as illustrated and described herein can be controlled to provide direct drive of the turbocharger 12 by the engine 10 when necessary and to allow the turbocharger 12 to function normally when the energy provided by the exhaust gas from the exhaust manifold 24 of the engine 10 is sufficient to drive the turbine wheel 32 and the compressor wheel 36. FIG. 4 illustrates an exemplary strategy for controlling the turbocharger variable speed control mechanism 50 in the form of a graph 130 of an engine output of the engine 10 versus the braking force applied by the brake actuator mechanism 78. The engine output may be any measured or calculated parameter that is indicative of the output of the engine 10 and relevant to determining when the brake actuator mechanism 78 should be in the non-braking, the full braking or the partial braking state. In various implementations, relevant engine output parameters may include the speed of the engine output shaft 18, the torque output on the engine output shaft 18 or the kinetic energy of the exhaust gas in the high pressure exhaust gas line 28. In other embodiments, the engine output may be determined indirectly based the inputs to the engine 10 such as the air mass flow rate from the air intake manifold 20 to the compression cylinders 16 of the engine 10, the air fuel ratio of the mixture being injected into the compression cylinder 16 or other inputs from which the output of the engine 10 may be calculated. Further, the speed of the turbocharger shaft 34 can provide an indication of the engine output and whether a need exists under the operating conditions to engage or disengage the turbocharger variable speed control mechanism 50. These or any other parameters or combinations of parameters from which the engine output may be derived and which can provide an indication of when the turbocharger variable speed control mechanism 50 should be engaged and braking force applied to balance holding the ring gear 66 stationary versus allowing free or restricted rotation of the ring gear 66 are contemplated for use in apparatus and methods in accordance with the present disclosure.

A braking force application curve 132 on the graph 130 of FIG. 4 provides an exemplary control strategy for operating the turbocharger variable speed control mechanism 50 as the engine output varies during operation of the engine 10. A low engine output region of the braking force application curve 132 up to a first predetermined engine output may represent the engine 10 running but idling with the engine output torque not being used to drive other components and systems. At the low engine output, the engine 10 may not produce exhaust gas with sufficient pressure and temperature to drive the turbine wheel 32, and the exhaust gas and its pollutants may accumulate in the turbocharger 12. Consequently, it may be desirable to engage the turbocharger variable speed control mechanism 50 and lock the ring gear 66 with a partial braking force so that the engine output shaft 18 can drive the turbine wheel 32 and pump the exhaust gas to the exhaust system 26. As the engine 10 continues to operate in the low engine output region, the pressure and temperature of the exhaust gas may increase and spool up the turbocharger 12 to the point where the exhaust gas torque drives the turbine wheel 32. As the exhaust gas torque increases, a ring gear torque on the ring gear 66 may become greater than the braking torque from the partial braking force applied to the brake disk 76 by the electro magnets 80. Slippage may occur to allow the turbine wheel 32 to rotate under the exhaust torque faster than when constrained to rotate at the speed dictated by the rotation of the engine output shaft 18 and the gear ratio of the planetary gear set 62. If the engine output and, correspondingly, the exhaust torque on the turbine wheel 32 decrease, the turbine wheel 32 may slow until the braking torque is greater than the ring gear torque so that the partial braking force holds the ring gear 66 stationary.

An intermediate engine output region of the braking force application curve 132 from the first predetermined engine output to a second predetermined engine output represent a period where the engine 10 is accelerating but the turbocharger 12 is not yet spooled up to the point where the exhaust gas will drive the turbine wheel 32 to a sufficiently high speed. In the intermediate engine output region, the turbocharger variable speed control mechanism 50 is actuated to the full braking state with the full braking force so that the ring gear 66 is held stationary and the engine output shaft 18 drives the turbine wheel 32. The turbocharger variable speed control mechanism 50 will remain in the full braking state until the engine output exceeds the second predetermined engine output and enters a high engine output region where the exhaust gas has sufficient pressure, temperature and kinetic energy for the turbine wheel 32 to rotate faster than the engine output shaft 18 will rotate the turbocharger shaft 34 based on the gear ratio of the planetary gear set 62. When the engine output is reduced from the high engine output region, the turbocharger variable speed control mechanism 50 will revert to the full braking state when the engine output drops below the second predetermined engine output and into the intermediate engine output region, and then back to the partial braking state when the engine output is below the first predetermined engine output.

Figure 5:
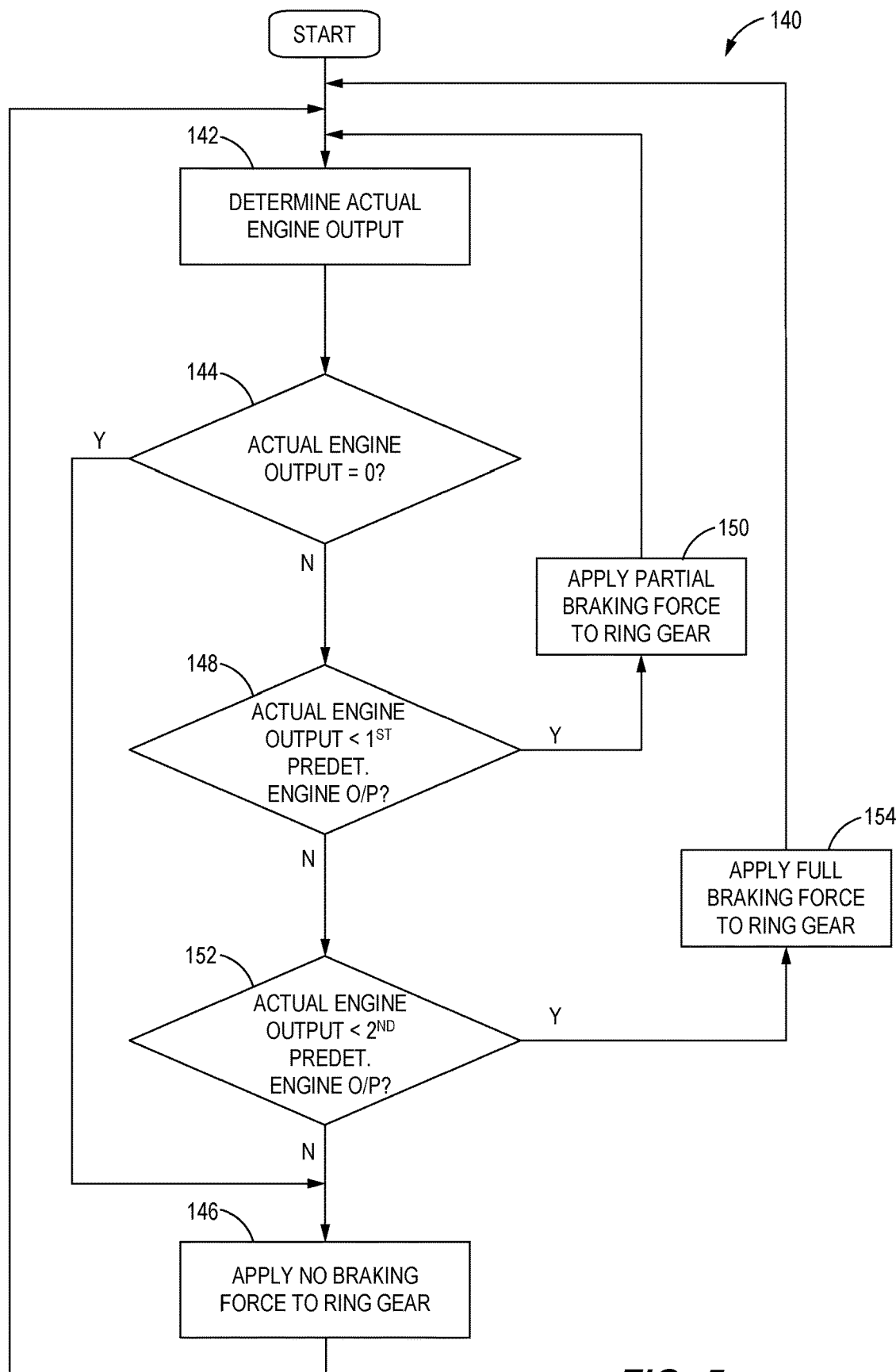
FIG. 5 is a flow diagram of a variable speed control torque control routine for controlling the turbocharger variable speed control mechanism in accordance with the present disclosure.

The braking force application curve 132 may be implemented by an variable speed control control routine 140 as that shown in FIG. 5 that is executed by the ECM 100. The variable speed control control routine 140 may begin at a block 142 where the ECM 100 determines an actual engine output for the engine 10 based on the sensor signals provided by one or more of the sensors 110, 112, 114, 116. As discussed above, the engine output may be represented by the engine output shaft speed, the engine output shaft torque, the exhaust gas kinetic energy calculated from the exhaust gas pressure and temperature, the air mass flow rate from the air intake manifold 20, the air fuel ratio of the mixture provided to the compression cylinder 16, the turbocharger shaft speed or other appropriate measures the output of the engine. After the actual engine output is determined, control may pass to a block 144 where the ECM 100 determines if the actual engine output is greater than zero and the engine 10 is running. If the engine is not running, it is not necessary to actuate the brake actuator mechanism 78, control may pass to a block 146 where the brake actuator mechanism 78 is not actuated and no braking force is applied to the ring gear 66.

If the actual engine output is greater than zero at the block 144, the engine 10 is running and control may pass to a block 148 where the ECM 100 compares the actual engine output to the first predetermined engine output to determine the region of the braking force application curve 132 in which the engine 10 is operating. If the actual engine output is less than the first predetermined output at the block 148, the engine 10 is operating in the low output region of the braking force application curve 132, and control may pass to a block 150 where the brake actuator mechanism 78 is actuated to the partial braking state and the electro magnets 80 apply the partial braking force to the brake disk 76. As discussed above, the engine output shaft 18 will drive the turbocharger shaft 34 until the exhaust gas creates sufficient torque on the turbine wheel 32 and correspondingly and the ring gear 66 that slippage will occur between the brake disk 76 and the magnetic field of the electro magnets 80 to allow the ring gear 66 to rotate and the turbine wheel 32 to accelerate. After the brake actuator mechanism 78 is actuated to the partial braking state, control may pass back to the block 142 where the ECM 100 will again determine the actual engine output.

If the actual engine output is greater than the first predetermined engine output at the block 148, control may pass to a block 152 where the ECM 100 compares the actual engine output to the second predetermined engine output to determine if the engine 10 is operating in the intermediate output region or in the high output region. If the actual engine output is less than the second predetermined output at the block 152, the engine 10 is operating in the intermediate output region of the braking force application curve 132, and control may pass to a block 154 where the brake actuator mechanism 78 is actuated to the full braking state and the electro magnets 80 apply the full braking force to the brake disk 76. The engine output shaft 18 will drive the turbocharger shaft 34 as long as the actual engine output remains in the intermediate output region. After the brake actuator mechanism 78 is actuated to the full braking state, control may pass back to the block 142 where the ECM 100 will again determine the actual engine output. If the actual engine output is greater than the second predetermined engine output at the block 152, the engine 10 is operating in the high output region and the ring gear 66 can be released to allow the turbine wheel 32 to rotate freely under the exhaust torque created by the exhaust gas. In this case, control may pass to the block 146 where the brake actuator mechanism 78 is not actuated and no braking force is applied to the ring gear 66.

Turbocharger variable speed control mechanisms 50 in accordance with the present disclosure can increase responsiveness of turbochargers 12 at lower engine outputs and lower exhaust gas temperatures and pressures. Brake actuator mechanisms 78 as illustrated and described are controllable in response to engine operating conditions and sensor signals to apply variable braking forces to positively drive the turbocharger 12 when necessary to improve efficiency and reduce buildup of pollutants. At the same time, the brake actuator mechanism 78 can be released when the turbocharger 12 is spooled up to allow the turbine wheel 32 to rotate freely under the influence of the engine exhaust gas having sufficient temperature and pressure. The control strategy for the turbocharger variable speed control mechanism 50 can be monitored and revised over time to optimize the efficiency of the operation of the engine 10 and the turbocharger 12.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A turbocharger variable speed control mechanism for a turbocharger for an internal combustion engine, the turbocharger including a turbine wheel mounted on a turbocharger shaft for rotation therewith, the turbocharger variable speed control mechanism comprising:
    a planetary gear set comprising:
        a sun gear coupled to the turbocharger shaft for rotation therewith,
        a ring gear,
        a planet carrier operatively connected to an engine output shaft of the internal combustion engine so that rotation of the engine output shaft causes corresponding rotation of the planet carrier, and
        a plurality of planet gears rotatably mounted on the planet carrier and meshing with the sun gear and the ring gear;
    a ring gear support sleeve disposed in axial alignment over a portion of the turbocharger shaft disposed between the planetary gear set and the turbine wheel such that the ring gear support sleeve and the turbocharger shaft are rotatable relative to each other, wherein the ring gear support sleeve is coupled to the ring gear for rotation therewith;
    a brake disk mounted on the ring gear support sleeve for rotation therewith and extending radially outward from the ring gear support sleeve; and
    a brake actuator mechanism disposed proximate the brake disk and mounted to a turbocharger housing of the turbocharger to remain stationary relative to the turbocharger housing,
    wherein the brake actuator mechanism is selectively actuatable between a non-braking state where the brake actuator mechanism does not apply a braking force to the brake disk so that the ring gear is free to rotate relative to the turbocharger housing, and a full braking state where the brake actuator mechanism applies a full braking force to the brake disk such that the ring gear is held stationary relative to the turbocharger housing and rotation of the planet carrier is transmitted through the planetary gear set to cause rotation of the turbocharger shaft.

2. The turbocharger variable speed control mechanism according to claim 1, wherein the brake actuator mechanism comprises a pair of electro magnets mounted to the turbocharger housing and disposed on either side of the brake disk.

3. The turbocharger variable speed control mechanism according to claim 2, wherein the pair of electro magnets are actuated to generate a magnetic field that creates the full braking force on the brake disk in the full braking state.

4. The turbocharger variable speed control mechanism according to claim 1, wherein the brake actuator mechanism comprises:
    a brake pad mounted to the turbocharger housing and movable in an axial direction relative to the ring gear support sleeve and the brake disk; and
    a solenoid actuator that is actuatable to cause the brake pad to move axially into engagement with the brake disk to create the full braking force on the brake disk in the full braking state.

5. The turbocharger variable speed control mechanism according to claim 1, wherein the internal combustion engine has a first predetermined engine output and a second predetermined engine output that is greater than the first predetermined engine output, and wherein the brake actuator mechanism is actuated to the full braking state when an actual engine output is greater than the first predetermined engine output and less than the second predetermined engine output.

6. The turbocharger variable speed control mechanism according to claim 5, wherein the brake actuator mechanism is actuated to the non-braking state when the actual engine output is greater than the second predetermined engine output.

7. The turbocharger variable speed control mechanism according to claim 6, wherein exhaust gas from the internal combustion engine is directed at the turbine wheel to create an exhaust torque on the turbocharger shaft, and wherein the brake actuator mechanism is selectively actuatable to a partial braking state where the brake actuator mechanism applies a partial braking force to the brake disk that is less than the full braking force so that slippage can occur between the brake actuator mechanism and the brake disk when the exhaust torque applied to the turbocharger shaft creates a ring gear torque on the ring gear that exceeds a braking torque created by the partial braking force on the brake disk.

8. The turbocharger variable speed control mechanism according to claim 7, wherein the brake actuator mechanism is actuated to the partial braking state when the actual engine output is less than the first predetermined engine output.

9. A turbocharger for an internal combustion engine comprising:

a turbocharger housing;

a turbocharger shaft mounted for rotation within the turbocharger housing;

a turbine wheel mounted on the turbocharger shaft for rotation therewith, wherein exhaust gas from the internal combustion engine is directed at the turbine wheel to create an exhaust torque on the turbocharger shaft;

a compressor wheel mounted on the turbocharger shaft for rotation therewith, wherein compressed air is discharged from the turbocharger to an air intake manifold of the internal combustion engine due to rotation of the compressor wheel;

a planetary gear set having a sun gear coupled to the turbocharger shaft for rotation therewith, a ring gear, a plurality of planet gears meshing with the sun gear and the ring gear, and a planet carrier having the plurality of planet gears rotatably mounted thereon and operatively connected to an engine output shaft of the internal combustion engine so that rotation of the engine output shaft causes corresponding rotation of the planet carrier;

a ring gear support sleeve disposed in axial alignment over a portion of the turbocharger shaft disposed between the planetary gear set and the turbine wheel such that the ring gear support sleeve and the turbocharger shaft are rotatable relative to each other, wherein the ring gear support sleeve is coupled to the ring gear for rotation therewith;

a brake disk mounted on the ring gear support sleeve for rotation therewith and extending radially outward from the ring gear support sleeve; and a brake actuator mechanism disposed proximate the brake disk and mounted to the turbocharger housing to remain stationary relative to the turbocharger housing, wherein the brake actuator mechanism is selectively actuatable between a non-braking state where the brake actuator mechanism does not apply a braking force to the brake disk so that the ring gear is free to rotate relative to the turbocharger housing, and a full braking state where the brake actuator mechanism applies a full braking force to the brake disk such that the ring gear is held stationary relative to the turbocharger housing and rotation of the planet carrier is transmitted through the planetary gear set to cause rotation of the turbocharger shaft.

10. The turbocharger according to claim 9, comprising:
a carrier shaft connected to the planet carrier for rotation therewith; and
a carrier drive gear connected to the carrier shaft for rotation therewith and operatively connected to the engine output shaft so that rotation of the engine output shaft causes corresponding rotation of the carrier drive gear and the planet carrier.

11. The turbocharger according to claim 9, wherein the brake actuator mechanism comprises a pair of electro magnets mounted to the turbocharger housing and disposed on either side of the brake disk, and wherein the pair of electro magnets are actuated to generate a magnetic field that creates the full braking force on the brake disk in the full braking state.

12. The turbocharger according to claim 9, wherein the brake actuator mechanism comprises:
a brake pad mounted to the turbocharger housing and movable in an axial direction relative to the ring gear support sleeve and the brake disk; and a solenoid actuator that is actuatable to cause the brake pad to move axially into engagement with the brake disk to create the full braking force on the brake disk in the full braking state.

13. The turbocharger according to claim 9, wherein the internal combustion engine has a first predetermined engine output and a second predetermined engine output that is greater than the first predetermined engine output, and wherein the brake actuator mechanism is actuated to the full braking state when an actual engine output is greater than the first predetermined engine output and less than the second predetermined engine output.

14. The turbocharger according to claim 13, wherein the brake actuator mechanism is actuated to the non-braking state when the actual engine output is greater than the second predetermined engine output.

15. The turbocharger according to claim 14, wherein the brake actuator mechanism is selectively actuatable to a partial braking state where the brake actuator mechanism applies a partial braking force to the brake disk that is less than the full braking force so that slippage can occur between the brake actuator mechanism and the brake disk when the exhaust torque applied to the turbocharger shaft creates a ring gear torque on the ring gear that exceeds a braking torque created by the partial braking force on the brake disk, and wherein the brake actuator mechanism is actuated to the partial braking state when the actual engine output is less than the first predetermined engine output.

16. A method for providing variable speed control torque to a turbocharger for an internal combustion engine, the turbocharger including a turbocharger shaft with a turbine wheel and a compressor wheel mounted for rotation therewith, a planetary gear set having a sun gear coupled to the turbocharger shaft for rotation therewith, a ring gear, a plurality of planet gears meshing with the sun gear and the ring gear, a planet carrier having the plurality of planet gears rotatably mounted thereon and operatively connected to an engine output shaft of the internal combustion engine so that rotation of the engine output shaft causes corresponding rotation of the planet carrier, and a ring gear support sleeve disposed in axial alignment over a portion of the turbocharger shaft disposed between the planetary gear set and the turbine wheel such that the ring gear support sleeve and the turbocharger shaft are rotatable relative to each other, wherein the ring gear support sleeve is coupled to the ring gear for rotation therewith, the method for providing variable speed control torque comprising:

determining an actual engine output of the internal combustion engine;

comparing the actual engine output to a first predetermined engine output and a second predetermined engine output, wherein the second predetermined engine output is greater than the first predetermined engine output;

actuating a brake actuator mechanism to apply a full braking force to the ring gear in response to determining that the actual engine output is greater than the first predetermined engine output and less than the second predetermined engine output, wherein the ring gear and the ring gear support sleeve are held stationary by the full braking force relative to a turbocharger housing of the turbocharger and rotation of the planet carrier is transmitted through the planetary gear set to cause rotation of the turbocharger shaft relative to the ring gear support sleeve; and applying no braking force from the brake actuator mechanism to the ring gear in response to determining that the actual engine output is greater than the second predetermined engine output so that the ring gear is free to rotate relative to the turbocharger housing.

17. The method for providing variable speed control torque according to claim 16, comprising actuating the brake actuator mechanism to apply a partial braking force to the ring gear in response to determining that the actual engine output is less than the first predetermined engine output, wherein the partial braking force is less than the full braking force such that slippage can occur to allow the ring gear to rotate relative to the turbocharger housing when an exhaust torque applied to the turbocharger shaft by exhaust gas from the internal combustion engine creates a ring gear torque on the ring gear that exceeds a braking torque created by the partial braking force on the ring gear.

18. The method for providing variable speed control torque according to claim 16, wherein the turbocharger has a brake disk mounted to the ring gear for rotation therewith, wherein the brake actuator mechanism comprises a pair of electro magnets mounted to the turbocharger housing and disposed on either side of the brake disk, and wherein actuating the brake actuator mechanism to apply the full braking force comprises actuating the pair of electro magnets to create a magnetic field that creates the full braking force on the brake disk.

19. The method for providing variable speed control torque according to claim 16, comprising applying no braking force from the brake actuator mechanism to the ring gear in response to determining that the actual engine output is equal to zero.

20. The method for providing variable speed control torque according to claim 16, wherein the actual engine output is an actual engine speed, the first predetermined engine output is a first predetermined engine speed, and the second predetermined engine output is a second predetermined engine speed that is greater than the first predetermined engine speed.

* * * * *